N. HOGAN.
PROTECTOR FOR TREES OR OTHER VEGETATION.
APPLICATION FILED MAR. 17, 1913.
1,155,313.
Patented Sept. 28, 1915.
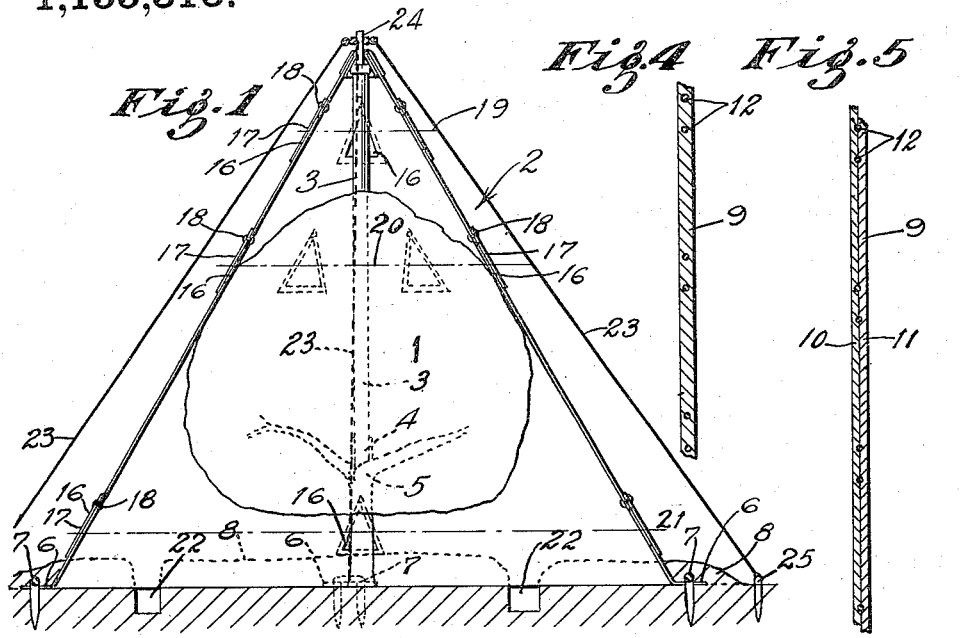
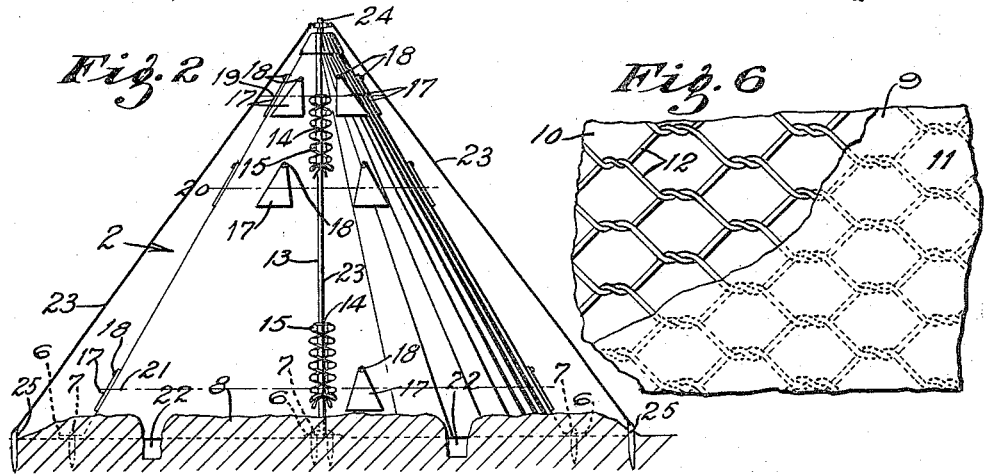
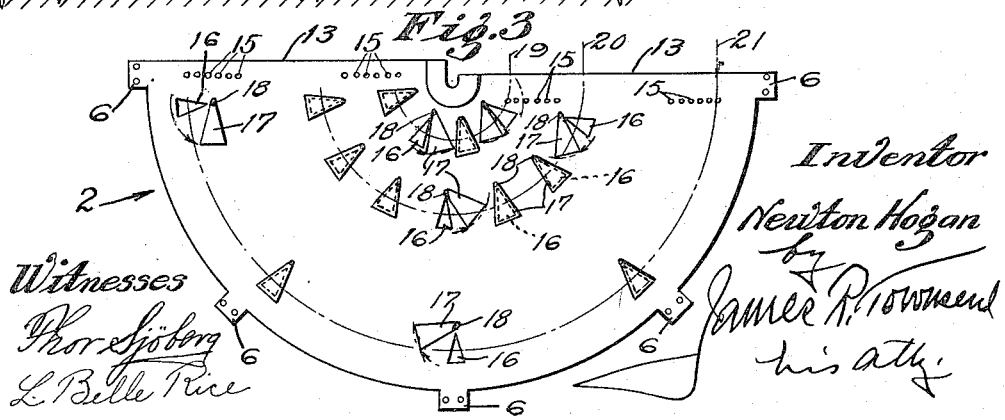

UNITED STATES PATENT OFFICE.

NEWTON HOGAN, OF LOS ANGELES, CALIFORNIA.

PROTECTOR FOR TREES OR OTHER VEGETATION.

1,155,313.  Specification of Letters Patent.  Patented Sept. 28, 1915.

Application filed March 17, 1913. Serial No. 755,016.

*To all whom it may concern:*

Be it known that I, NEWTON HOGAN, a citizen of the United States, residing at Los Angeles, in the county of Los Angeles and State of California, have invented a new and useful Protector for Trees or Other Vegetation, of which the following is a specification.

This invention relates to novelly constructed means to be used in connection with fruit trees or any other vegetation whatsoever, and serves adequately to protect said trees against cold, wind, hail, and other meteorological inclemencies.

To this end the invention contemplates the use of a novelly-constructed and supported hood which may be spread over the tree or foliage, and which is made preferably of material having an impervious body portion and reinforcing means therefor.

The accompanying drawings illustrate the invention.

Figure 1 is an elevation in cross section of the applicant's novel protecting means and shows it in position over a tree. Fig. 2 is an elevation of the protecting means. Fig. 3 shows the development of the hood embraced in this invention. Fig. 4 illustrates an enlarged cross-section through one form of material with which the hood may be constructed. Fig. 5 illustrates an enlarged cross-section through another form of the material with which the hood may be constructed. Fig. 6 is a perspective view showing a fragment of the hood material, the body portion of same being severed and separated so as to display one form of reinforcing means used therewith.

Though the invention may be used for protecting all kinds of foliage and vegetation, Fig. 1 illustrates it as applied to a fruit tree 1. A hood 2, having a conical or other suitable shape, is spread or erected over the tree, and is supported by the upper end of a pole 3, while the lower end 4 of said pole is adapted to rest on the usual tree crotch 5. The lower end of said hood is preferably fastened and sealed to the earth by any suitable means whatsoever, the figures showing a cheap and easily manipulated expedient for accomplishing this result. This expedient comprises the leaves 6 projecting from the lower perimeter of the hood, and adapted to receive staples 7 which pin said leaves and hood to the earth, while a low dirt mound 8 may be shoveled all around the hood so as to seal same to the earth.

Particular features of novelty embraced in this invention reside in certain provisions whereby the hood is made substantial, durable and self-supporting by reinforcing means, and whereby it is also impervious to cold, wind, etc. These provisions are accomplished by constructing the hood of material comprising a treated body portion, which is impervious to meterological inclemencies, and by uniting suitable reinforcing means with said body portion, so that rigidity and durability are insured to the material. One class of material, which gives particularly valuable service for this purpose, is illustrated in Figs. 4, 5 and 6, and will now be described. The body portion 9 of this material, Fig. 5, comprises two layers, 10 and 11, of a loose-grained paper or fabric, which may be formed, for instance, of wood pulp mixed with felt; and which paper or fabric has been treated by soaking it with liquid asphaltum or other oily product, or which has been treated by any substance whatsoever, so as to make it impervious to water, wind, cold, etc. By being substantially moisture proof, the integrity of the material and hood is not impaired by snow, rain or dampness, to which it may be often subject; and by being impervious to the cold the hood serves admirably for retaining the tree's own body warmth within itself, and for shielding the tree and fruit thereon against destructive frosting or freezing temperatures without. The layers 10 and 11 are glued together, or are attached to each other, by any suitable method of adhesion, and in this form the means for reinforcing the material may be conveniently introduced in the form of wires 12 and between layers 10 and 11. Though in no sense is it contemplated to limit the reinforcing means to wires, yet a very cheap and substantial material can be produced thereby; and though the wires may be attached to the body 9 in any manner desired, and in any relation, to each other, yet one practical arrangement is shown in Fig. 5 wherein the wires are embedded within the body portion 9, and which is further shown in Fig. 6, wherein the embedded wires bear an interlaced relation to each other so as to provide a continuous wire netting throughout. This insures a light material having sufficient rigidity for the purpose, and prevents it from being torn or ripped when handled.

Fig. 4 shows another form of material differing from that shown in Fig. 5 principally in the fact that the reinforcing wires 12 have been milled right into and along with the body portion 9 instead of having the latter formed of two layers attached to each other as in Fig. 5. This form of the material is less expensive to produce, and having a unitary body portion is usually more durable than the form shown in Fig. 5.

Depending on the climate in the particular place the protection is spread over the trees at periods when the frosting or freezing conditions of winter are expected to commence. Before being spread over the tree the hood may have the form of a flat sector as shown in Fig. 3 in which case many hoods may be stacked onto each other for the purpose of convenient storage. When ready for application to the tree, however, the edges 13 of the hood are wrapped around the tree and are then laced together by any suitable means, such as the lacing 14, Fig. 2, embracing and connecting the two rows of hooks 15 on the two edges 13 respectively. The outline of the hood as illustrated in Fig. 3 has three sides, a semi-circular side and two straight sides 13 of substantially the same length, one of the straight sides passing through a line parallel to and spaced apart from the other straight side to form an overlapping portion whereby the sides 13 may be readily fastened to one another when the hood is in erect position. The hood being thus erected before the cold weather sets in, is left in position until the warm weather of spring arrives, and in the meanwhile serves to retain within the tree and fruit the heat produced by the natural biological development within. This feature is particularly valuable in citrus growing regions where the fruit is developing on the tree during the winter seasons, and it is valuable in this connection not only in saving the citrus crop against frost, but also in saving the whole tree from destruction by an occasional freeze. A further feature of value lies in the protection afforded against winds to which the hood is impervious. When these are permitted to blow upon the open tree the fruit is often threshed prematurely therefrom; or else the fruit is battered back and forth against the sharp edges of the bark, so that the skin may be bruised and marred, and the market value of the fruit thereby reduced. All this, however, is avoided by using the invention herein described.

The impervious hood being in position all through the winter season it is necessary, especially at noonday when the temperature is warm, that the tree be adequately ventilated and exposed to the light, so that its growth and development may not be arrested, and so that the ripening of its fruit may continue without interruption. For this purpose a series of ventilating openings 16 are cut through the hood, and each opening is provided with an adjustable closure 17 pivotally mounted by a pin or rivet 18. These closures are slightly larger than the openings, so that the former may lap over and completely seal the latter. As seen in a few instances in Fig. 3 these closures may, however, be swung on pivot 18 so as to adjustably uncover opening 16 to a greater or less extent.

As seen in Fig. 1 the openings 16 may be suitably arranged in different tiers 19, 20 and 21, successively below each other. In this event the closures may be slid off the openings in the upper tiers at the apex of the hood, the openings there being clustered together so as to permit light to flood down onto the tree, while the closures may additionally be slid off the lower openings so as to permit complete ventilation from the bottom to the top of the hood. These closures, of course, may be left opened or closed to a greater or less extent at all times, according to the external temperature, etc.; and since biological re-actions go on within the tree the latter in effect becomes a warmth generator of sufficient capacity to preserve itself against the touches of frost or cold that tend to leak in through the hood. The warmth generated by the tree also tends constantly to produce convection currents which percolate in and out through the cracks between the closure 17 of the hood, and through other cracks, and which thereby serve to maintain a slow but adequate ventilation, sufficient to bring the fresh vital air in for the tree.

If it is further desired a trench 22, Fig. 1, may be dug across the surface of the earth before the hood is erected, the said trench being of sufficient length so as to extend adequately beyond the perimeter of the hood. With such a trench ventilating air may be constantly admitted to the hood, and this air though coming from the cold exterior is warmed by contact with the warm earth forming the sides of the trench. This secures ample ventilation for trees of any character whatsoever.

It will be understood also that the hood, hereinbefore described, is particularly useful when artificial heating means, such as electrical or other heaters, are used to supplement the natural warming capacity of the tree itself. It will be also understood that for such purpose, as forcing the fruit for instance warm manure may be spread on the earth beneath the tree and within the hood, and that the fermentation of said manure will also adequately supplement the warming capacity of the tree so as to carry same through relatively cold severe conditions of the external air. In either of these cases, the trench 22 is especially serviceable for supplying fresh air whereby the heating reactions may be supported.

In times of extreme wind it will be desirable to have means in addition to all the foregoing which will prevent the hood from careening hard over onto the tree and rubbing back and forth on same. For this purpose supporting wires 23 run from some point near the top of the hood, such as pin 24 on pole 3, the said wires being taut and having their lower extremities anchored to the earth as by staples 25.

From the foregoing it is seen that by making the hood of a conical shape to cover and protect vegetable growth and providing said conical hood at intervals therearound with openings, the solar rays can penetrate to the interior of the hood whatever the direction of said rays regardless of the time of day and the season so that growth will be interfered with to a minimum degree.

In view of the foregoing detail description it is believed that the construction and operation of the device embodying this invention will be clear.

I claim:—

1. A tree protector comprising a flat reinforced sheet having three sides, one a semi-circular side and two straight sides, one of the straight sides passing through a line that is parallel to and spaced apart from the other side whereby to form an overlapping portion, said straight sides being adapted to engage with one another when the sheet is wrapped around a tree, the sheet when in protecting position forming a conical housing over the tree with the overlapping portion of said one side extending over the other side and permitting a place of securement from the top to the bottom of the protector, and hooks formed in the sheet near the adjacent straight sides, and fastening means passed around said hooks to fasten the adjacent sides to one another.

2. A device of the character described comprising a flat sheet of substantially semi-circular conformation reinforced with wire netting to give the sheet a partially rigid structure, said sheet having two radial sides out of alinement with one another, said radial sides being adapted to engage one another when the sheet is wrapped around a tree, and means provided around the circular periphery of said sheet, said means being adapted to be fastened to the ground to secure the lower edge of the sheet in place when the sheet is wrapped around a tree.

3. A device of the character described comprising a flat sheet of substantially semi-circular conformation reinforced with wire netting, said sheet having two radial sides out of alinement with one another, a notched reinforcement positioned between the two adjacent ends of said radial sides, and a pole adapted to be positioned centrally of the tree to be protected, said sheet being adapted to be wrapped around said tree with its notched reinforcement secured to the upper end of said pole and its radial sides fastened to one another.

In testimony whereof, I have hereunto set my hand at Los Angeles, California, this 10th day of March, 1913.

NEWTON HOGAN.

In presence of—
JAMES R. TOWNSEND,
ROBERT A. STEPS.

Copies of this patent may be obtained for five cents each, by addressing the "Commissioner of Patents, Washington, D. C."